United States Patent
Tanaka et al.

(10) Patent No.: US 9,309,958 B2
(45) Date of Patent: Apr. 12, 2016

(54) GEAR TRAIN LUBRICATING DEVICE

(75) Inventors: Kenichiro Tanaka, Kobe (JP); Tatsuhiko Goi, Kobe (JP); Hidenori Arisawa, Kakogawa (JP); Motohiko Nishimura, Matsudo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 323 days.

(21) Appl. No.: 13/809,557

(22) PCT Filed: Jul. 11, 2011

(86) PCT No.: PCT/JP2011/003969
§ 371 (c)(1),
(2), (4) Date: Mar. 29, 2013

(87) PCT Pub. No.: WO2012/008142
PCT Pub. Date: Jan. 19, 2012

(65) Prior Publication Data
US 2013/0180803 A1    Jul. 18, 2013

(30) Foreign Application Priority Data

Jul. 12, 2010  (JP) ................................. 2010-158008

(51) Int. Cl.
*F16H 57/04* (2010.01)

(52) U.S. Cl.
CPC ........ *F16H 57/0421* (2013.01); *F16H 57/0409* (2013.01); *F16H 57/0423* (2013.01); *F16H 57/0495* (2013.01)

(58) Field of Classification Search
CPC . F16H 57/0493; F16H 57/04; F16H 57/0421; F16H 57/0409; F16H 57/0423; F16H 57/0495

USPC ................................ 184/6.12, 109; 74/606 R
See application file for complete search history.

(56) References Cited

U.S. PATENT DOCUMENTS

| | | | |
|---|---|---|---|
| 2,277,270 A * | 3/1942 | Schmitter et al. ................ 418/32 |
| 3,788,426 A * | 1/1974 | Hull, Jr. ......................... 184/109 |
| 4,667,774 A * | 5/1987 | Roberge ........................ 184/6.12 |
| 5,004,407 A * | 4/1991 | Hutchison ......................... 418/1 |
| 5,467,667 A | 11/1995 | Zaiser et al. |
| 7,963,186 B2 * | 6/2011 | Hayes et al. ..................... 74/467 |
| 2010/0140019 A1 * | 6/2010 | Imai et al. ..................... 184/6.12 |

FOREIGN PATENT DOCUMENTS

| | | |
|---|---|---|
| DE | 29517964 U1 | 1/1996 |
| JP | 48-030097 B | 9/1973 |

(Continued)

*Primary Examiner* — William A Rivera
*Assistant Examiner* — Michael Riegelman
(74) *Attorney, Agent, or Firm* — Sughrue Mion, PLLC

(57) ABSTRACT

A lubricating device for a gear train (5) including a plurality of gears meshing with each other includes a shroud (7) configured to cover the gear train (5) and a housing (9) configured to cover the shroud (7). The shroud (7) includes: an oil supply nozzle (25) configured to supply oil (OL) to a meshing position (21) of the gear train (5); and oil-drain ports (41) through which the oil (OL) is discharged from the shroud. The housing (9) includes, at its lower part, a draw-out port (43) through which the oil (OL) discharged from the oil-drain ports (41) is drawn to the outside of the housing. Guide members (47) are provided between the shroud (7) and the housing (9). The guide members (47) guide the oil (OL) discharged from the respective oil-drain ports (41) of the shroud (7) such that the oil (OL) flows downward through space (S) between the shroud (7) and the housing (9).

10 Claims, 8 Drawing Sheets

(56) References Cited

FOREIGN PATENT DOCUMENTS

| | | |
|---|---|---|
| JP | 04-503558 A | 6/1992 |
| JP | 06-213303 A | 8/1994 |
| JP | 2008-025832 A | 2/2008 |
| JP | 2009-209980 A | 9/2009 |
| WO | 91/05965 A1 | 5/1991 |
| WO | 96/15392 A1 | 5/1996 |

* cited by examiner

GEAR TRAIN LUBRICATING DEVICE

CROSS REFERENCE TO RELATED APPLICATION

This application is a National Stage of International Application No. PCT/JP2011/003969 filed on Jul. 11, 2011, which claims priority from Japanese Patent Application No. 2010-158008, filed Jul. 12, 2010, the contents of all of which are incorporated herein by reference in their entirety.

TECHNICAL FIELD

The present invention relates to a gear train lubricating device for use in a gear system such as a gearbox or a high-speed gear mechanism used in a gas turbine engine or a jet engine.

BACKGROUND ART

Such a gear system as mentioned above includes a lubricating oil supply port and a lubricating oil outlet port for use in lubricating and cooling down the gears. The lubricating oil supply port is used for spraying lubricating oil onto the gears, and the lubricating oil outlet port is used for collecting, with an oil scavenging pump, the lubricating oil that has been used for lubricating and cooling down the gears. Power loss in such a gear system is mainly caused by air resistance and lubricating oil agitation resistance, which occur when the gears rotate. Particularly in the case of an aircraft engine, the gear train rotates at a relatively high speed, and therefore, air resistance due to the rotation of the gears is great. Moreover, in aircrafts developed in recent years, electrification of various airframe facilities has been promoted rapidly. Therefore, in the near future, a necessary power generation capacity is expected to increase greatly. In this case, power loss in a gear system that is caused by the air resistance and the lubricating oil agitation resistance also increases, which results in an increase in negative influence on the fuel consumption of an aircraft engine such as a jet engine or a gas turbine engine.

For the purpose of reducing the above-described power loss in a gear system, there is a proposed gear shrouding system (see Patent Literature 1) in which a plurality of gears meshing with each other in a gear train are covered by a shroud, so that a swirling air flow, which tends to be generated near front-end and rear-end faces of each gear when air is dragged by these faces of each gear due to rotation of the gears, is suppressed and thereby the air resistance is reduced. The shroud includes: a pair of side walls disposed opposite to the sides of each gear and in close proximity to the radially outer face of each gear; and an end wall disposed perpendicular to the pair of side walls and parallel to both of the front-end and rear-end faces of each gear. The shroud is provided such that the side walls and the end wall enclose both of the front-end and rear-end faces of each of the plurality of gears of the gear train. The end wall of the shroud is provided with an injection nozzle for injecting lubricating oil onto the gears and a second port for discharging the lubricating oil from the shroud. The shrouding system is capable of reducing air resistance due to rotation of the gears since the shroud, which is disposed in close proximity to the teeth of the gears, suppresses the above-described swirling air flow generated near both of the front-end and rear-end faces of each gear.

CITATION LIST

Patent Literature

PTL 1: Japanese National Phase PCT Laid-Open Publication No. 4-503558

SUMMARY OF INVENTION

Technical Problem

The above-described shroud covering the gears of the gear train, and other components surrounding the shroud, need to form a structure suitable for smoothly guiding the lubricating oil to an outlet port without causing stagnation of the lubricating oil and then efficiently discharging the lubricating oil through the outlet port so that the air resistance and lubricating oil agitation resistance will be reduced effectively. If the lubricating oil remains near the outlet port, an excessive amount of lubricating oil also remains within the shroud. As a result, the installation of the shroud adversely causes an increase in lubricating oil agitation resistance. However, Patent Literature 1 discloses a technique using the shroud merely intending to improve a cooling effect by the lubricating oil, and does not take into consideration efficient discharging of the lubricating oil through the outlet port.

The present invention has been made to solve the above-described problems, and an object of the present invention is to provide a gear train lubricating device capable of suppressing stagnation of oil that has been guided from around a gear train to an outlet port of a shroud and efficiently discharging the oil from the shroud through the outlet port, thereby effectively reducing air resistance and lubricating oil agitation resistance to suppress power loss.

Solution to Problem

In order to achieve the above object, a gear train lubricating device according to the present invention includes: a shroud covering a gear train including a plurality of gears meshing with each other, the shroud including an oil supply nozzle configured to supply oil to a meshing position of the gear train and including oil-drain ports through which the oil is discharged from the shroud; a housing configured to cover the shroud, the housing including at its lower part, a draw-out port through which the oil discharged from the oil-drain ports is drawn to outside of the housing; and guide members provided between the shroud and the housing and configured to guide the oil discharged from the respective oil-drain ports of the shroud such that the oil flows downward through space between the shroud and the housing.

According to the gear train lubricating device, the shroud covering the gear train suppresses generation of a swirling air flow near end faces of the gears, and thus air resistance can be reduced. Moreover, the flow velocity of the oil around the gears is reduced. Accordingly, oil discharging performance can be improved. Furthermore, the guide members provided at the shroud facilitate drawing of the oil to the outside through the draw-out port. As a result, stagnation of the oil near the oil-drain ports is suppressed. Accordingly, stagnation of the oil within the shroud is suppressed. Consequently, oil agitation resistance within the shroud is reduced, and therefore, power loss is suppressed.

In the lubricating device according to the present invention, the oil-drain ports may be formed at upper and lower parts of the shroud, and the draw-out port may be disposed below the oil-drain ports formed at the lower part of the shroud. According to this structure, the oil-drain ports are provided not only at the upper part of the shroud but also at the lower part of the shroud. Accordingly, within the shroud, oil stagnation around the gears is reduced. As a result, power loss due to agitation resistance is reduced. Further, since the draw-out port is disposed below the oil-drain ports formed at the lower part of the shroud, the oil that is discharged from the shroud is discharged to the outside of the housing assuredly.

In the lubricating device according to the present invention, it is preferred that the guide members either protrude upward from an upper wall of the shroud or protrude downward from a lower wall of the shroud. This makes it possible to effectively guide the oil downward with a simple structure.

In the lubricating device according to the present invention, the oil-drain ports may be formed only at an upper part of the shroud. According to this structure, there is no oil-drain port provided at the lower part of the shroud. Therefore, the amount of oil that remains near the draw-out port provided at the lower part of the housing is reduced, and discharging of the oil through the draw-out port to the outside of the housing is facilitated.

In the above structure where the oil-drain ports are formed only at the upper part of the shroud, it is preferred that the guide members are disposed along a side wall of the shroud, and guide the oil discharged from the respective oil-drain ports such that the oil flows downward while preventing the oil from re-entering the shroud from around rotational axes of the respective gears. According to this structure, the guide members reduce a possibility that the oil enters the shroud from around the rotational axes of the gears, and also, the oil is effectively guided to the draw-out port at the lower part of the housing. Therefore, agitation resistance is further reduced for the gears. Moreover, if each of the guide members has its lower edge positioned below a corresponding one of through-holes of the shroud, through which the rotational axes penetrate the shroud, then the possibility that the oil re-enters the shroud from around the rotational axes of the gears is further reduced.

In the lubricating device according to the present invention, it is preferred that the guide members are fixed to the shroud. According to this structure, the gear train lubricating device can be assembled by merely inserting the shroud, to which the guide members are fixed, into the housing that has a structure dividable into two parts. This eases the fabrication of the gear train.

Advantageous Effects of Invention

According to the gear train lubricating device of the present invention, the guide members prevent stagnation of oil around the oil-drain ports of the shroud. Accordingly, the oil around the gear train is smoothly guided to the oil-drain ports of the shroud and efficiently discharged from the shroud through the oil-drain ports. In this manner, air resistance and lubricating oil agitation resistance due to rotation of the gears are effectively reduced, and power loss of the gear train can be suppressed, accordingly.

DESCRIPTION OF EMBODIMENTS

Hereinafter, preferred embodiments of the present invention are described with reference to the drawings.

(Embodiment 1)

Figure 1:
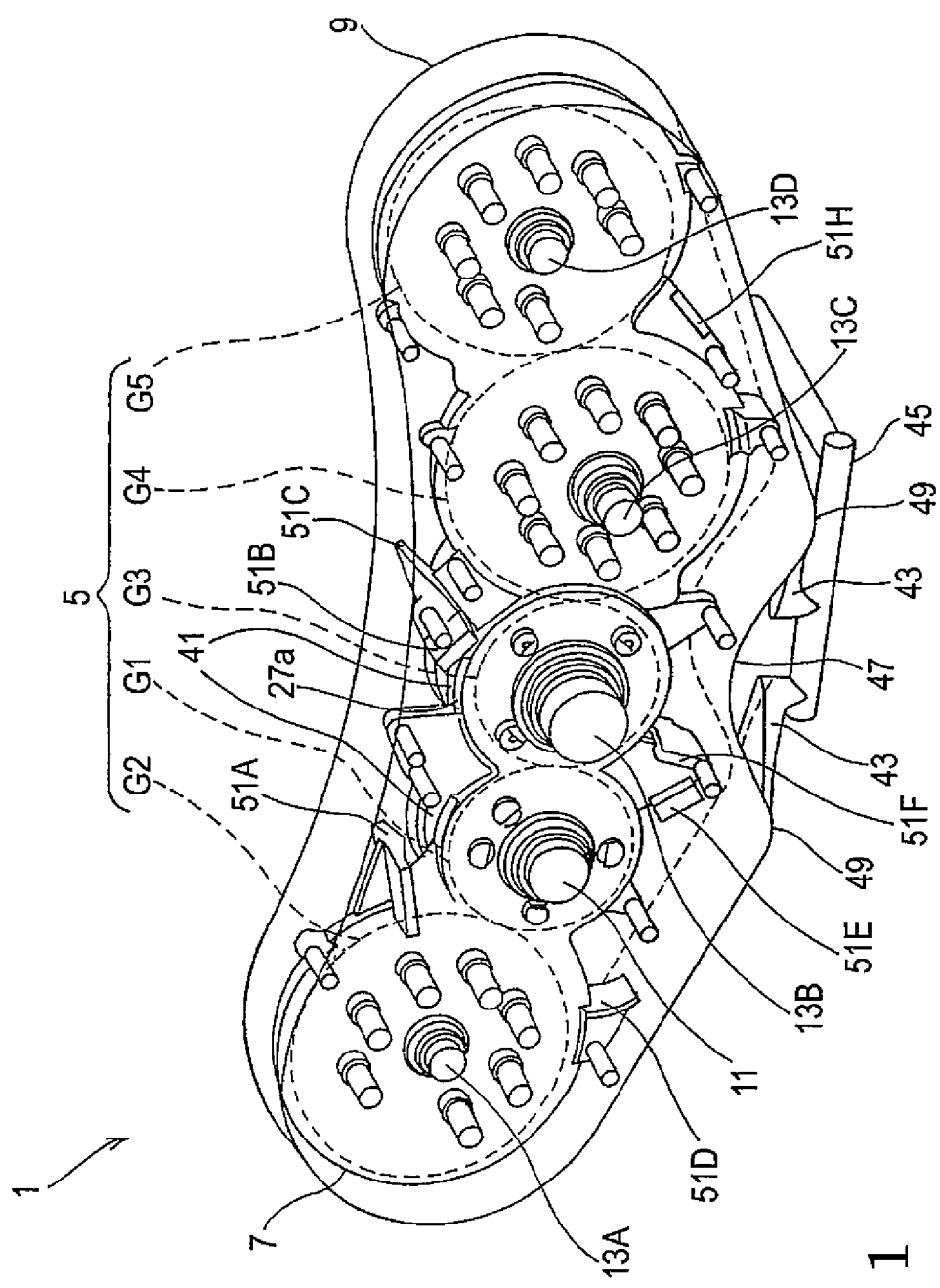
FIG. 1 is a perspective view showing a gear system including a gear train lubricating device according to Embodiment 1 of the present invention.

FIG. 1 is a perspective view showing a gear system 1 including a lubricating device according to preferred Embodiment 1 of the present invention. The gear system 1 includes: a gear train 5 including a plurality of (five in the present embodiment) gears G1 to G5 meshing with one another; a shroud 7 covering the gear train 5; and a housing 9 covering the shroud 7 such that space is formed between the housing 9 and the shroud 7. FIG. 1 gives a transparent view of the housing 9, showing the shroud 7 disposed within the housing 9.

Figure 2:
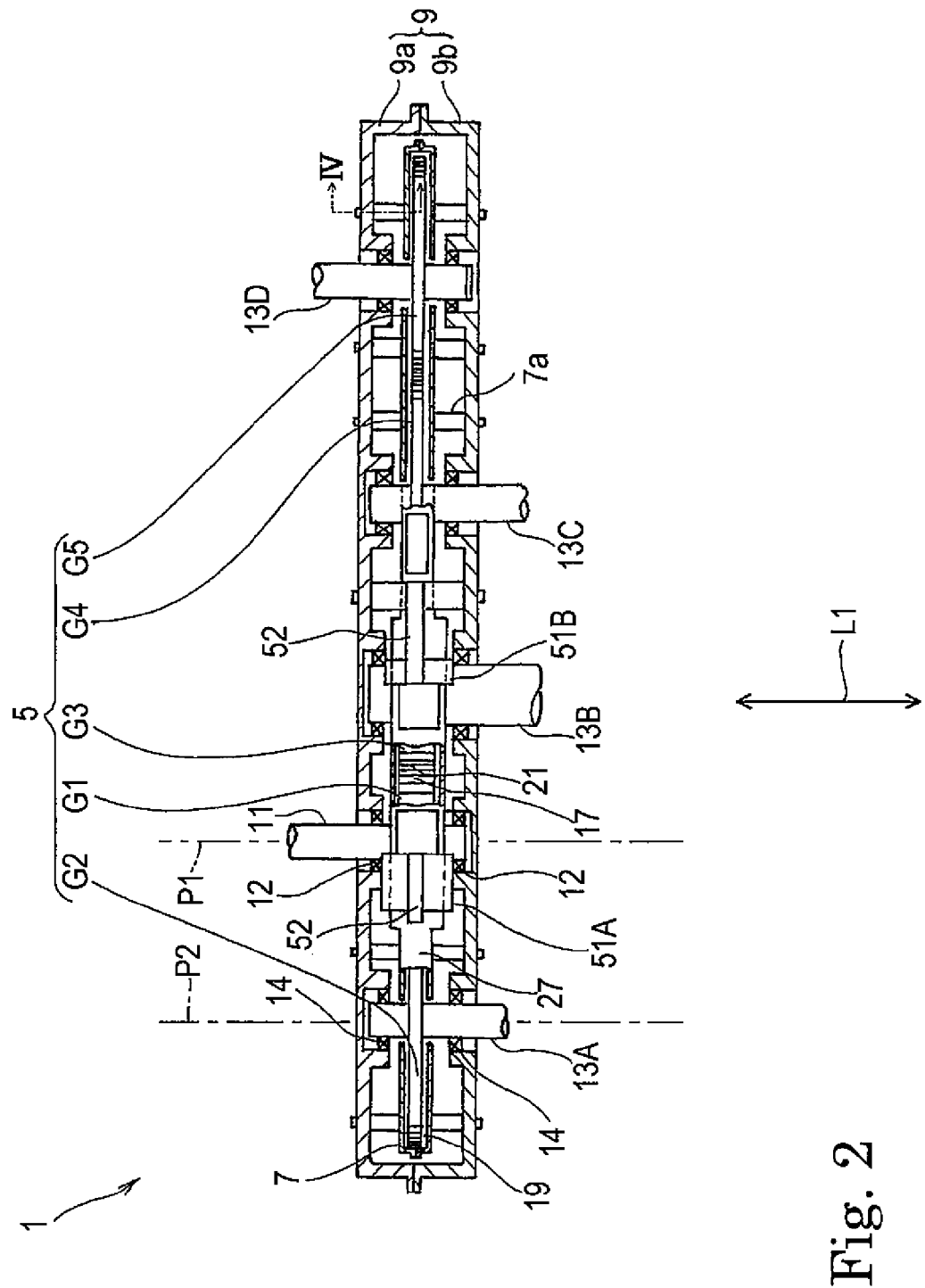
FIG. 2 is a plan view showing an internal structure of the above gear system.

FIG. 2 is a plan view schematically showing the interior of the housing 9 of FIG. 1. As shown in FIG. 2, one of the plurality of gears G1 to G5 forming the gear train 5 is an input gear G1 which is a spur gear fixed to an input shaft 11. The input shaft 11 is rotatably supported by the housing 9 via a pair of bearings 12. One end of the input shaft 11 is connected to a power source such as a jet engine via a power transmission device which is not shown. The input gear G1, and a plurality of (four in the present embodiment) output gears (first to fourth output gears) G2 to G5 which are spur gears integrally formed with respective output shafts 13A to 13D, are sequentially meshed with one another. The input shaft 11 and the output shafts 13A to 13D are all in parallel. The axial direction of these shafts coincides with an axial direction L1 which is the axial direction of the shroud 7 and the housing 9. The output shafts 13A to 13D are connected to, for example, a power generator/starter and an oil pump.

In the present embodiment, one side of the input gear G1 (left side in FIG. 2) is meshed with the first output gear G2. The other side, i.e., the opposite side to said one side, of the input gear G1 (right side in FIG. 2) is meshed with the second output gear G3. The second output gear G3, the third output gear G4, and the fourth output gear G5 are sequentially meshed with one another. In this manner, the gear train 5 is formed. It should be noted that the description below may refer only to a part of the gears G1 to G5 and its surrounding structure as a representative example, in which case the other gears may have the same structure unless otherwise specified.

Figure 3:
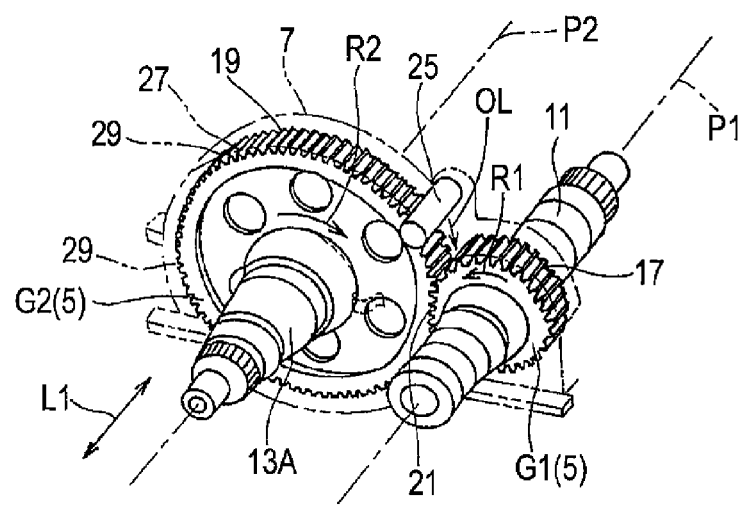
FIG. 3 is a perspective view showing a part of a gear train of the above gear system.

The output shaft 13A is rotatably supported by the housing 9 via a pair of bearings 14. One end of the output shaft 13A is connected to an accessory device such as a power generator via a power transmission device which is not shown. Teeth 17 and 19, which are spur teeth, are integrally formed with the gears G1 and G2, respectively. The central axis P1 and the central axis P2 of the input gear G1 and the output gear G2, respectively, are parallel to each other. Accordingly, a meshing position 21 between the gears G1 and G2 is positioned on a plane that includes the central axes P1 and P2. As shown in FIG. 3, the gears G1 and G2 rotate in R1 and R2 directions, respectively, such that they mesh with each other at the meshing position 21 while moving downward. Accordingly, a position above the meshing position 21 serves as a suction side of a gear pump function exerted by the gear train 5.

Figure 4:
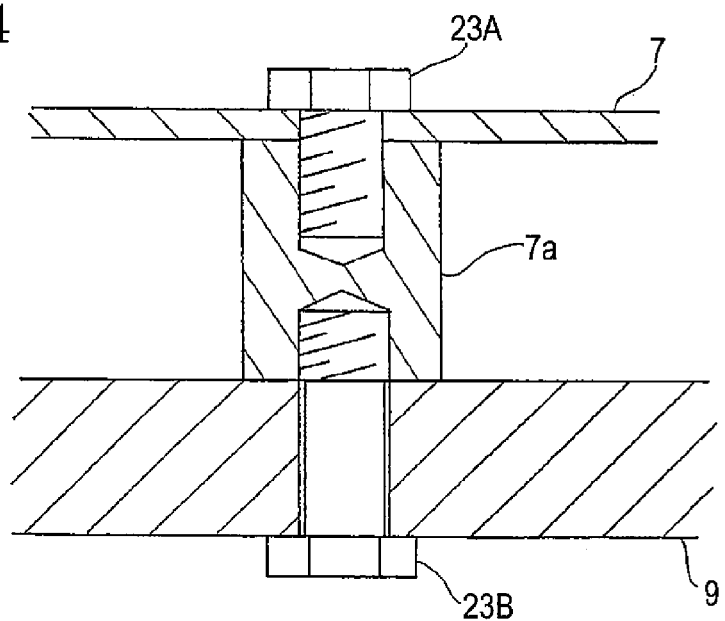
FIG. 4 is a cross-sectional view along line IV-IV in FIG. 2.

Most of the side faces and the teeth 17 and 19 of the gear train 5 are covered by the shroud 7. The shroud 7 is formed of a metal such as aluminum or a resin. The shroud 7 has a structure dividable in the axial direction L1 into two parts. The shroud 7 is fixed to the inner faces of respective side walls of the housing 9 in a form that is shown in an enlarged manner in FIG. 4 which is a cross-sectional view along line IV-IV in FIG. 2. Specifically, a column 7a extending in the axial direction L1 is fixed to an outer side face of the shroud 7 by a fixing bolt 23A inserted from the inside of the shroud 7. The column 7a is fixed to the housing 9 by a fixing bolt 23B inserted from the outside of a side wall of the housing 9. As shown in FIG. 2, the housing 9 also has a structure dividable in the axial direction L1 into two parts, and a first housing half body 9a and a second housing half body 9b are connected by bolts and nuts which are not shown.

As shown in FIG. 3, an oil supply nozzle 25 configured to supply oil OL downward to the meshing position 21 is fixed to the shroud 7 in a manner to penetrate the shroud 7 in the axial direction L1. That is, the oil supply nozzle 25 supplies the oil OL to the meshing position 21 in a direction perpendicular to the central axes P1 and P2 of the gear train. A lubricating oil pump, which is not shown, supplies the oil supply nozzle 25 with the oil OL for use in gear lubrication.

The shroud 7 includes: an outer peripheral wall 27 covering the gear train 5 from radially outward; and side walls 29 connected to both respective side edges of the outer peripheral wall 27, the side walls 29 being opposed to each other in the axial direction L1 so as to cover both respective side faces of the gear train 5. Further, as clearly shown in FIG. 5, through-holes 31 and 33 are formed in each of the side walls 29. The through-hoes 31 and the through-holes 33 allow the input shaft 11 and the output shaft 13A (FIG. 3), respectively, to penetrate through the side walls 29.

Figure 5:
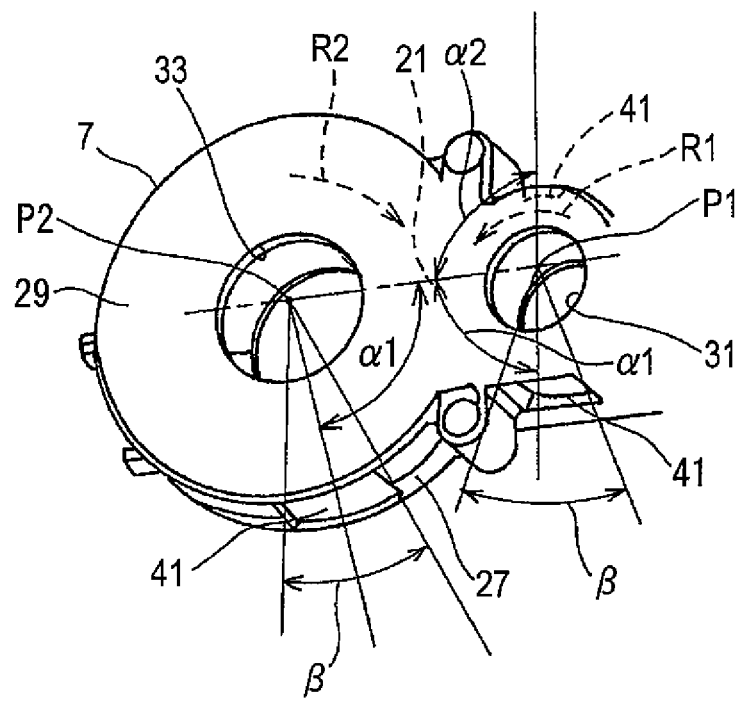
FIG. 5 is a perspective view of a shroud of the above lubricating device, the perspective view being seen from below.

As shown in FIG. 1, a plurality of oil-drain ports 41 are formed in the outer peripheral wall 27 of the shroud 7. As shown in FIG. 5, the oil-drain ports 41 are provided such that the oil-drain ports 41 are rectangular when seen in the radial direction, and such that the positions of oil-drain ports 41 are away from the meshing position 21 of the gear train 5 in the rotation directions R1 and R2, respectively, by a positioning angle α1, and the position of another oil-drain port 41 is away from the meshing position 21 of the gear train 5 in a direction opposite to the rotation direction R1 by a positioning angle α2. The term "positions" of the respective oil-drain ports 41 refer to the central positions of the respective oil-drain ports 41 in the axial direction L1 and the circumferential direction. It is preferred that the positioning angles α1 and α2 are both in the range of 90°±45° in order to reduce resistance. Further, each oil-drain port 41 has an angular width β in the circumferential direction, which is preferably in the range of 45°±10° in order to reduce resistance.

Figure 6:
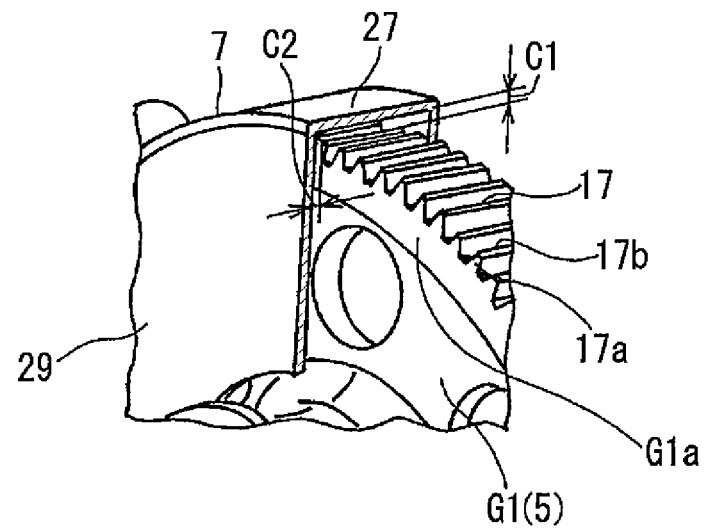
FIG. 6 is a partial cutaway perspective view of the above lubricating device.

As shown in FIG. 6, a radial direction gap C1 between the outer peripheral wall 27 of the shroud 7 and tooth tips 17b of the input gear G1 is set to 4 mm. The gap C1 is preferably in the range of 4±1 mm in order to reduce resistance which will be described below. Also, a gap C2 between each of the side walls 29 and a corresponding one of side faces G1a of the input gear G1, the side faces G1a being opposed to the respective side walls 29, is set to 4 mm. The gap C2 is also preferably in the range of 4±1 mm in order to reduce resistance. The gaps C1 and C2 in the above size are also formed for the output gears G2 to G5 shown in FIG. 2.

The size range of 4±1 mm of the gaps C1 and C2 is particularly meaningful when the gear train to be used is as described below. Specifically, the gears G1 to G5, to which the above-described gaps C1 and C2 are suitably applicable, have the following shapes: the pitch circle diameter of the input gear G1 is 40 to 500 mm; the pitch circle diameter of the output gears G2 to G5 is 90 110 mm; the face width of the gears of the gear train is 6 to 60 mm; and the whole depth of the gears of the gear train is 3 mm±1 mm. The present embodiment is suitably applicable to lubrication of the gear train 5 which rotates at a high peripheral speed of 50 to 120 m/sec. The settings as above reduce agitation resistance of the oil OL. Specifically, if the radial direction gap C1 between the outer peripheral wall 27 of the shroud 7 and the tooth tips of the gears G1 to G5 exceeds the aforementioned size range, then the amount of oil OL that remains between the outer peripheral wall 27 and the tooth tips increases, which results in an increase in oil agitation resistance. On the other hand, if the radial direction gap C1 is below the aforementioned size range, the flow resistance of the oil OL increases in the radial direction gap C1 between the shroud 7 and each of the gears G1 to G5.

Figure 7:
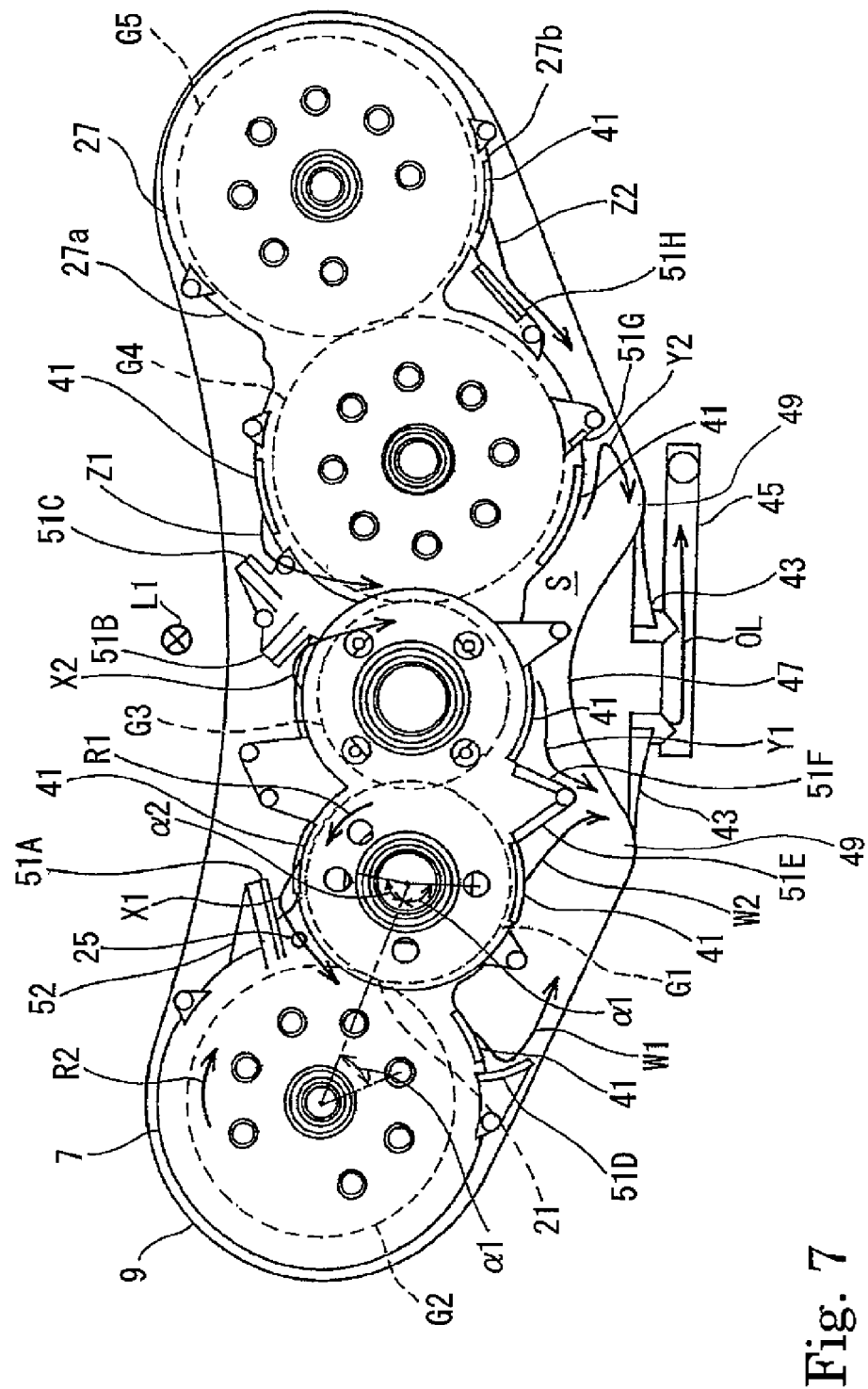
FIG. 7 is a front view showing the operation of the above gear system.

In the present embodiment, at least one of the upper part and the lower part of the shroud 7 is provided with the oil-drain ports 41 as shown in FIG. 7. Specifically, of an upper wall portion 27a of the outer peripheral wall 27 of the shroud 7, portions covering not the gears G2 and G5 at both ends but the gears G1, G3, and G4 among the gears G1 to G5 forming the gear train 5 are provided with respective oil-drain ports 41, i.e., a total of three oil-drain ports 41. Meanwhile, of a lower wall portion 27b of the outer peripheral wall 27 of the shroud 7, portions covering the five gears G1 to G5 are provided with respective oil-drain ports 41, i.e., a total of five oil-drain ports 41.

The lower part of the housing 9 is provided with draw-out ports 43 through which the oil OL discharged from the oil-drain ports 41 of the shroud 7 is drawn to the outside. A draw-out passage 45 is connected to the lower part of the draw-out ports 43. The oil OL is drawn to the outside by a pump (not shown) connected to the draw-out passage 45.

To be more specific, a curved-in portion 47 which is curved in upward is formed at substantially the center, in the longitudinal direction of the gear train 5, of the lower part of the housing 9. Two curved-out portions 49 are formed at both respective sides of the curved-in portion 47, and are provided with the respective draw-out ports 43. The draw-out ports 43 are disposed below the oil-drain ports 41 provided at the lower part of the shroud 7.

The shroud 7 is provided with a plurality of guide members 51A to 51H configured to guide the oil OL discharged from the respective oil-drain ports 41, such that the oil OL flows downward through space S between the shroud 7 and the housing 9 and further flows toward the draw-out ports 43. Hereinafter, when unspecified guide members among the plurality of guide members provided at the shroud 7 are referred to, such guide members are simply denoted by a reference numeral 51 with no alphabet. In the present embodiment, the same number of guide members 51 as the number of oil-drain ports 41 are provided. Specifically, the upper wall portion 27a of the outer peripheral wall 27 of the shroud 7 is provided with three guide members 51A to 51C, and the lower wall portion 27b of the shroud 7 is provided with five guide members 51D to 51H. Each of the guide members 51A to 51H has a guide face which guides the oil OL, and is supported by a stay 52 provided at the shroud 7. The stay 52 is integrally formed with the shroud 7, or is bolt-connected to the shroud 7 as a separate component. Alternatively, each guide member 51 and its corresponding stay 52 may be both integrally formed with the shroud 7. In this manner, the guide members 51 are arranged in the space S between the shroud 7 and the housing 9.

The three guide members 51A to 51C at the upper wall portion 27a are formed so as to protrude upward from the upper wall portion 27a. On the other hand, the five guide members 51D to 51H at the lower wall portion 27b are formed so as to protrude downward from the lower wall portion 27b. Thus, the oil OL can be effectively guided downward with this simple structure. Further, as shown in FIG. 2, the guide members 51 are plate materials extending in the axial direction L1. Both ends of each guide member 51 in the axial direction are in contact with, or in close proximity to, respective inner wall surfaces of the housing 9, the both ends being opposed to the respective inner wall surfaces in the axial direction L1. Accordingly, the oil OL is guided assuredly.

Next, functions of the lubricating device for the gear train 5 are described. The oil OL is jetted out downward from the oil supply nozzle 25 shown in FIG. 3, and the oil OL that is jetted out is supplied to the meshing position 21 of the gear train 5. As a result, the gears G1 and G2 are lubricated. The oil OL supplied to the meshing position 21 flows downward through the meshing position 21. Thereafter, the oil OL is, while being guided by the shroud 7, divided into two streams flowing toward the gear train, and one of the two streams of the oil OL is guided to the upper part of the input gear G1 and the other stream is guided to the upper part of the output gear G2. Then, as indicated by arrows W1 and W2 in FIG. 7, the oil OL is discharged to the outside of the shroud 7 through the oil-drain ports 41 provided below the respective gears G1 and G2, i.e., discharged into the space S between the shroud 7 and the housing 9.

The oil OL discharged through the oil-drain ports 41 to the outside of the shroud 7 is guided by the guide members 51D and 51E which are arranged such that the guide members 51D and 51E are substantially opposed to respective flow directions W1 and W2 of the oil OL. Accordingly, the oil OL smoothly flows downward within the housing 9, i.e., flows toward the draw-out ports 43. The oil OL that has reached the draw-out ports 43 passes through the draw-out passage 45 and is discharged to the outside of the housing 9.

The oil OL that is supplied from the nozzle 25 to the meshing position 21 between the input gear G1 and the output gear G3 flows out of the oil-drain ports 41 provided above the respective gears G1 and G3 in the directions indicated by arrows X1 and X2. Then, the oil OL is guided by the guide members 51A and 51B to flow downward through the space S within the housing 9 along the outer side faces of the shroud 7, and reaches the draw-out ports 43.

The oil OL that is supplied from the nozzle 25 to the meshing position 21 between the output gears G3 and G4 flows out of the oil-drain ports 41 provided below the respective gear G3 and G4 in the directions indicated by arrows Y1 and Y2. Then, the oil OL is guided by the guide members 51F and 51G to flow downward through the space S within the housing 9 along the outer side faces of the shroud 7, and reaches the draw-out ports 43.

A part of the oil OL that is supplied from the nozzle 25 to the meshing position 21 between the output gears G4 and G5 flows out of the oil-drain port 41 provided above the output gear G4 in the direction indicated by an arrow Z1 and is guided by the guide member 51C, and another part of the oil OL flows out of the oil-drain port 41 provided below the output gear G5 in the direction indicated by an arrow Z2 and is guided by the guide member 51H. Accordingly, the oil OL flows downward through the space S within the housing 9 along the outer side faces of the shroud 7, and reaches the draw-out ports 43.

As described above, the lubricating device according to Embodiment 1 includes the shroud 7 which covers the gear train 5. Accordingly, the flow velocity of the oil OL around the gear train 5 is reduced and the oil OL discharging performance is improved. In addition, the oil OL is quickly guided to the ports 43 by the guide members 51 provided at the shroud 7. Therefore, stagnation of the oil OL near the oil-drain ports 41 is suppressed. In this manner, stagnation of the oil OL within the shroud 7 is suppressed. As a result, oil agitation resistance within the shroud 7 is reduced. Accordingly, power loss of the gear train 5 is suppressed.

(Embodiment 2)

Figure 8:
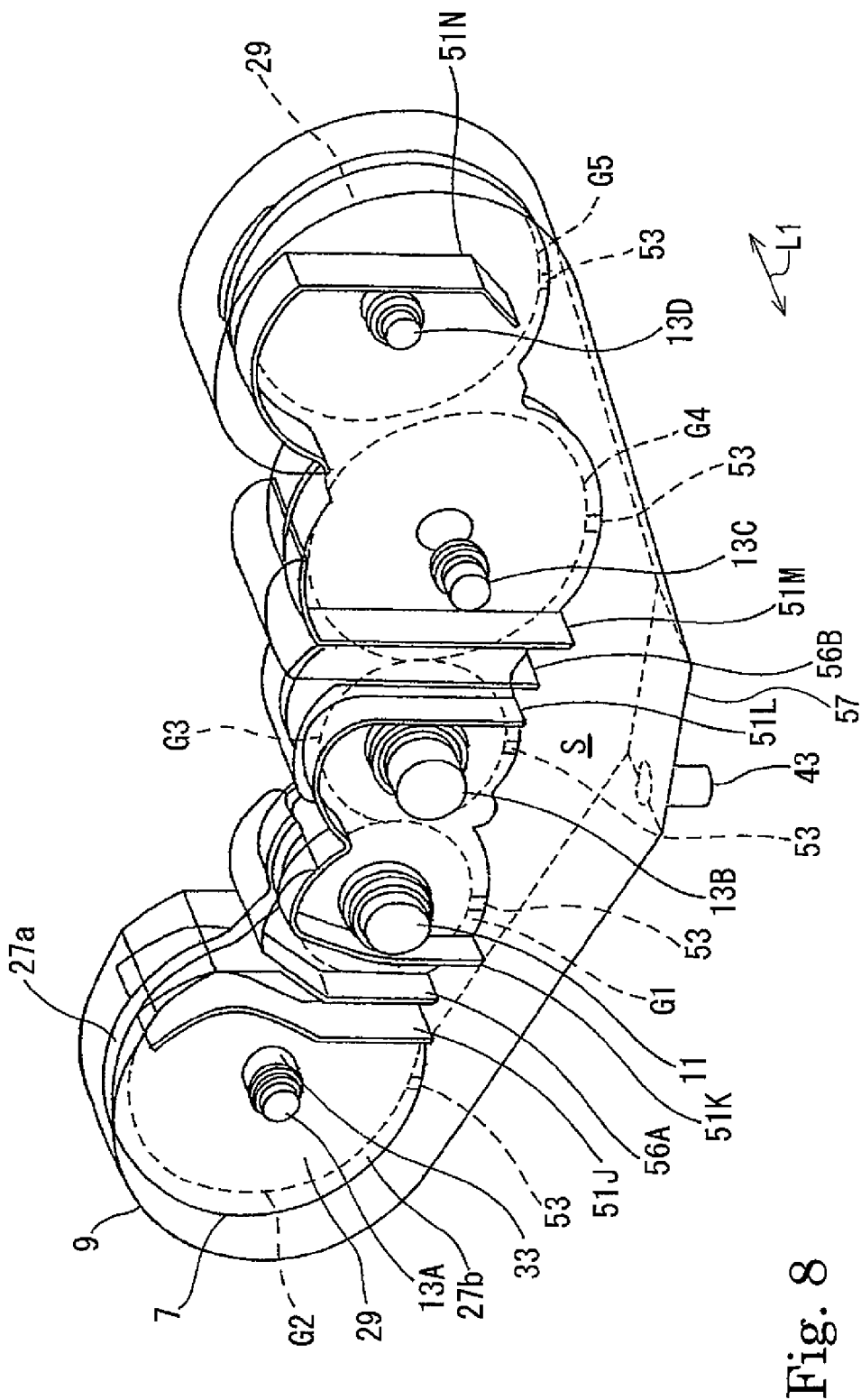
FIG. 8 is a perspective view showing a gear system including a gear train lubricating device according to Embodiment 2 of the present invention.
Figure 9:
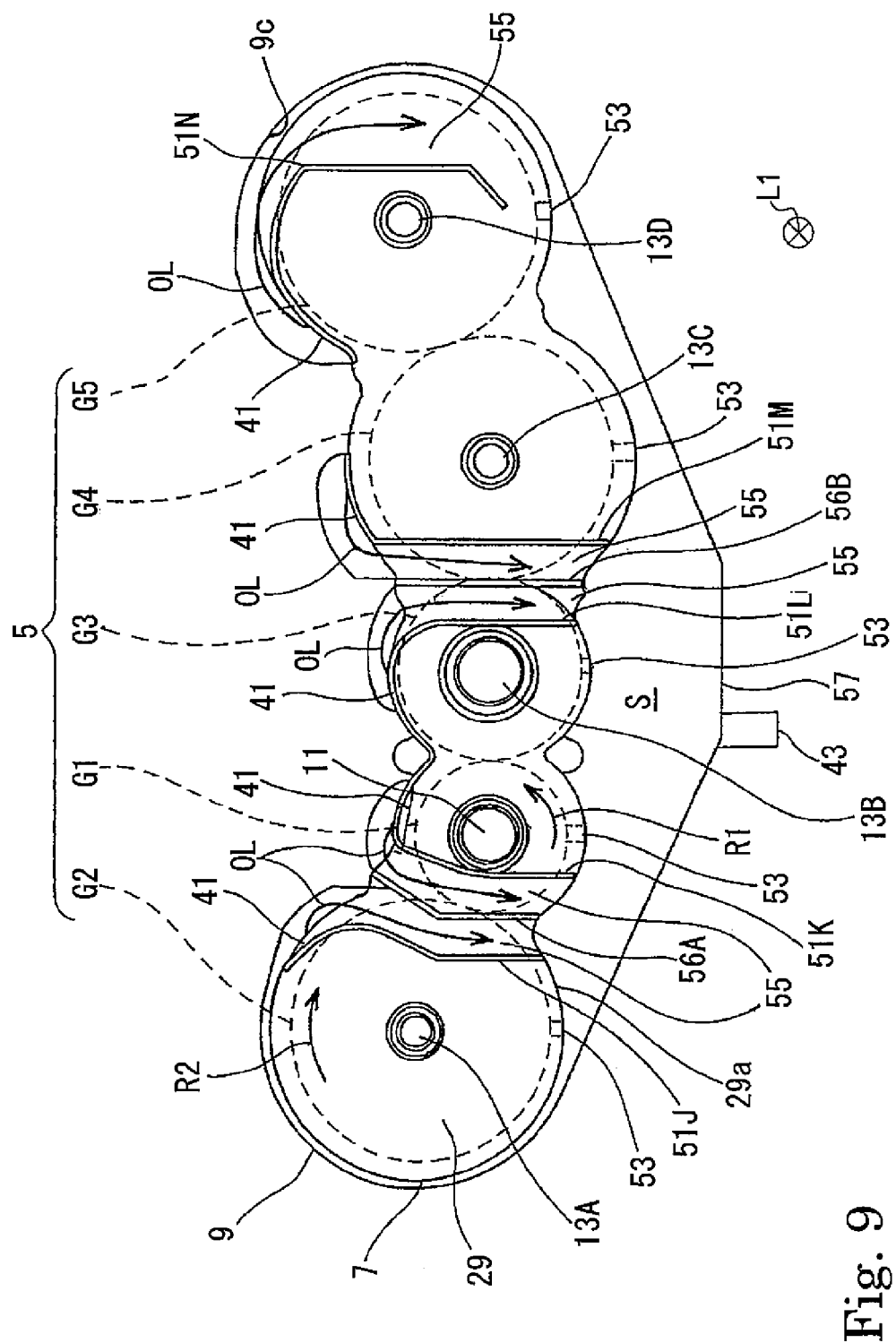
FIG. 9 is a front view showing the operation of the above gear system.

FIG. 8 shows the gear system 1 including a lubricating device according to preferred Embodiment 2 of the present invention. FIG. 9 is a front view showing the operation of the gear system 1. In the gear system 1 according to Embodiment 2, the oil-drain ports 41 in the gear system 1 according to Embodiment 1 shown in FIG. 1 are provided only at the upper side of the shroud 7. Except this feature and other points specifically described below, the gear system 1 according to Embodiment 2 has the same structure as that described in Embodiment 1.

As shown in FIGS. 8 and 9, the shroud 7 is provided so as to cover the five gears G1 to G5 forming the gear train 5. The upper wall portion 27a of the shroud 7 is provided with a total of five oil-drain ports 41 corresponding to the respective gears G1 to G5. On the other hand, the lower wall portion 27b of the shroud 7 is provided with a plurality of oil-drain holes 53 extending through the lower wall portion 27b. In the present embodiment, a total of five oil-drain holes 53 are provided corresponding to the respective gears G1 to G5. Each oil-drain port 41 has a larger area of passage than the area of passage of each oil-drain hole 53. Through each oil-drain port 41, the oil OL is discharged from the inside of the shroud 7 mainly when the gear system 1 operates, i.e., when the gear train 5 rotates. On the other hand, through each oil-drain hole 53 having a smaller area of passage than the area of passage of each oil-drain port 41, the oil OL is discharged from the inside of the shroud 7 mainly when the operation of the gear system 1 is stopped.

A plurality of guide members 51 (51J to 51N) are integrally formed with each of the side walls 29 of the shroud 7. In the present embodiment, each guide member 51 is provided corresponding to a respective one of the gears G1 to G5. Each guide member and its corresponding gear are arranged such that their positions overlap in the axial direction L1. Guide members 51 are plate-shaped and extend in the axial direction L1 from the side walls 29 of the shroud 7 to the inner side faces of the side walls of the housing 9. In other words, the guide members 51 connect between the side walls 29 of the shroud 7 and the side walls of the housing 9. The starting points of the respective guide members 51 are positioned near the oil-drain ports 41 at the upper part of the shroud 7. The guide members 51 extend above the respective rotational axes (the input shaft 11 and the output shafts 13A to 13D) of the gears G1 to G5. The end points of the respective guide members 51 are positioned at lower end portions 29a of the side walls 29. The starting portion of each guide member 51 is, at least partially, formed substantially in parallel to an inner peripheral face of the housing 9. Further, each guide member 51 has its lower edge 51a positioned below a corresponding one of the through-holes 31 (33) formed in the shroud 7.

Specifically, each guide member 51J, which is provided corresponding to the output gear G2 positioned at the leftmost side of the gear train 5, extends from near the oil-drain port 41 provided around the output gear G2, passes between the input shaft 11 and the output shaft 13A, and reaches the lower end portion 29a of the shroud side wall 29. Each guide member 51K, which is provided corresponding to the input gear G1 meshed with the output gear G2, extends from near the oil-drain port 41 provided around the input gear G1, passes between the input shaft 11 and the output shaft 13A, and reaches the lower end portion 29a of the shroud side wall 29. Each guide member 51L, each guide member 51M, and each guide member 51N, which are provided corresponding to the gear G3, the gear G4, and the gear G5, respectively, are formed in a manner similar to the above-described guide members 51J and 51K. As mentioned above, the lower edge 51a of each guide member 51 is positioned below its corresponding through-hole 31 or 33. This reduces a possibility that the oil OL discharged from the oil-drain ports 41 re-enters the shroud 7 through gaps (i.e., the through-holes 31 and 33 of the shroud 7) formed around the rotational axes (the input shaft 11 and the output shafts 13A to 13D) of the gear train 5.

The guide member 51J provided corresponding to the output gear G2, and the guide member 51K provided corresponding to the input gear G1, are adjacent to each other. Similarly, the guide member 51L provided corresponding to the output gear G3, and the guide member 51M provided corresponding to the output gear G4, are adjacent to each other. These pairs of adjacent guide members are formed such that, in each pair of adjacent guide members, the adjacent guide members are at least partially substantially parallel to each other. An auxiliary guide plate 56A is provided between the adjacent guide members forming one of the pairs, and an auxiliary guide plate 56B is provided between the adjacent guide members forming the other pair. Specifically, the auxiliary guide plate 56A is provided between the guide member 51J and the guide member 51K, such that space between the guide member 51J and the auxiliary guide plate 56A and space between the auxiliary guide plate 56A and the guide member 51K are formed as guide passages 55. Similarly, the auxiliary guide plate 56B is provided between the guide member 51L and the guide member 51M, such that space between the guide member 51L and the auxiliary guide plate 56B and space between the auxiliary guide plate 56B and the guide member 51M are formed as guide passages 55. Each guide passage 55 is formed such that the oil OL is guided to the lower side of the shroud 7. With this structure, the area of passage of the guide passages 55 is adjusted and the directional quality of the guide passages 55 is improved. As a result, stagnation of the oil OL within the guide passages 55 is prevented.

Of the inner peripheral face 9c of the housing 9, there is a downward curved portion positioned in a direction in which the oil OL flows out of the oil-drain port 41 that corresponds to the output gear G5 positioned at the rightmost side of the gear train 5. Further, there is formed a guide passage 55 between the guide member 51N provided corresponding to the output gear G5 and a portion of the inner peripheral face 9c of the housing 9, the portion covering the outer side of the guide member 51N.

In the present embodiment, a flat portion 57 is formed at substantially the center, in the longitudinal direction of the gear train 5, of the lower part of the housing 9. The flat portion 57 is positioned lower than the other portions, and is provided with a draw-out port 43 for the oil OL.

Figure 10:
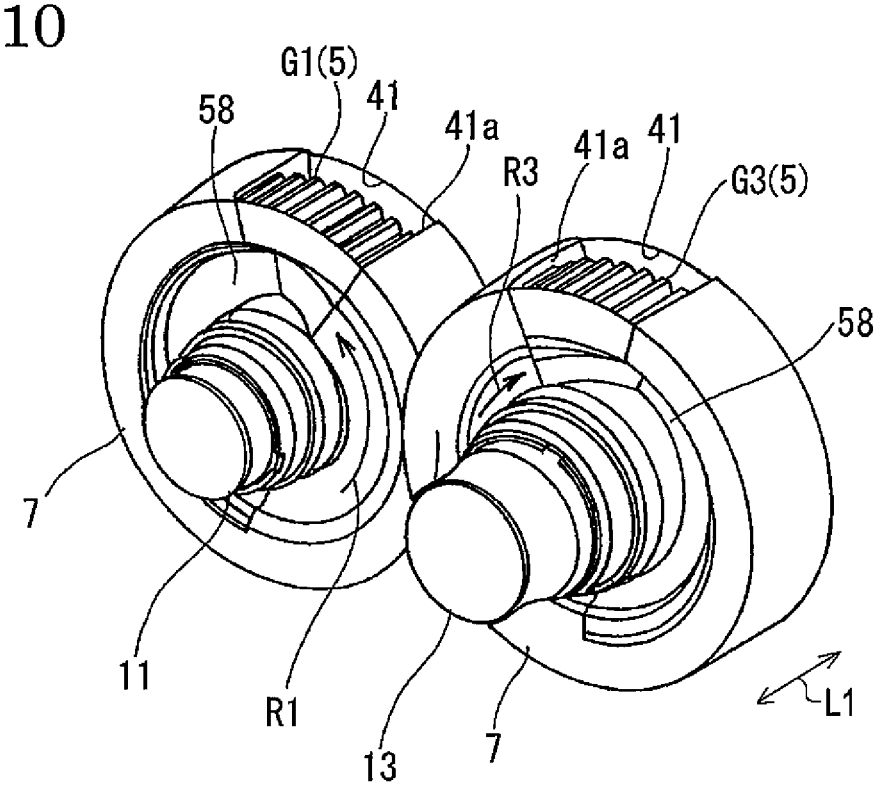
FIG. 10 is a perspective view of a shroud of the above lubricating device, the perspective view being seen from above.

Although not shown, each of the gears G1 to G5 is formed such that a disc part (or a spoke part) between an annular rim on which the teeth are formed and a central hub connected to the rotational axis of the gear is recessed in the axial direction to be thin-walled. Therefore, in accordance with such a shape of the disc part of each of the gears G1 to G5, a recess 58 which is recessed in the axial direction L1 may be formed at the side wall 29 of the shroud 7 as shown in FIG. 10. For example, a recess 58 is formed at a radially inner side of a portion of the side wall 29 of the shroud 7, the portion covering the input gear G1. The recess 58, which is recessed in the axial direction L1, is formed at a position that is more forward in the rotation direction R1 than an edge 41a of the oil-drain port 41, the edge 41a being a rear side edge in the rotation direction R1. In the example shown in FIG. 10, the recess 58, which is formed at the side wall 29 covering the input gear G1 of the shroud 7, is formed so as to be positioned more forward in the rotation direction R1 than the edge 41a which is the rear side edge of the oil-drain port 41, and extends over approximately 180° degrees in the circumferential direction. The description with reference to FIG. 10 refers, as a representative example, only to a portion of the shroud 7 that covers the input gear G1. However, the recess 58 may similarly be formed at other portions of the shroud 7 that correspond to the gears G2 to G5. When recesses 58 are formed at each side wall 29 of the shroud 7 in the above-described manner, the oil OL near the oil-drain ports 41 does not disperse in the axial direction L1 within the shroud 7, and thus the oil OL is efficiently discharged through the oil-drain ports 41.

Next, functions of the lubricating device for the gear train 5 according to Embodiment 2 are described. Similar to the above-described Embodiment 1, the oil OL that is discharged to the outside of the shroud 7 through the oil-drain ports 41 flows, as indicated by arrows in FIG. 9, into the guide passages 55, each of which is formed between guide members 51 or formed between a guide member 51 and the inner peripheral face of the housing 9. The oil OL that has flowed into the guide passages 55 flows through the guide passages 55 while being guided by the guide members 51, and smoothly flows to the lower part of the housing 9, i.e., toward the draw-out port 43. The oil OL that has reached the draw-out port 43 is discharged to the outside of the housing 9 through the draw-out passage 45. In particular, in the present embodiment, the oil-drain ports 41 are formed only at the upper part of the shroud 7 and there is no oil-drain port formed at the lower part of the shroud 7. Accordingly, the amount of oil OL that remains near the draw-out port 43 positioned at the lower part of the housing 9 is reduced, and the discharging of the oil to the outside through the draw-out port 43 is facilitated.

Further, in the present embodiment, the guide members 51 are provided in a manner to cover the respective rotational axes (the input shaft 11 and the output shafts 13A to 13D) of the gears G1 to G5 from above. Accordingly, a possibility that the oil OL re-enters the shroud 7 from around the rotational axes (the input shaft 11 and the output shafts 13A to 13D) of the gears G1 to G5 is reduced, and the oil OL is effectively guided to the draw-out port 43 provided at the lower part of the housing 9. Therefore, oil agitation resistance is greatly reduced for the gear train 5.

It should be noted that, unlike the above-described embodiments, the oil OL may be supplied to the meshing position 21 from forward with respect to the rotation direction of the gears. Even with such a structure, an efficient oil OL discharging effect similar to the one described above can be obtained.

Further, the rotation directions R1 and R2 of the gear train 5 may be set to the opposite directions to the directions specified in the above embodiments while the oil supply nozzle 25 is disposed at the same position as in the above embodiments. Even with such a structure, an efficient oil OL discharging effect similar to the one described above can be obtained.

Although preferred embodiments of the present invention have been described above with reference to the drawings, various additions, modifications, and deletions may be made to the above embodiments without departing from the spirit of the present invention. Therefore, such additions, modifications, and deletions also fall within the scope of the present invention.

INDUSTRIAL APPLICABILITY

The gear train lubricating device according to the present invention is capable of reducing power loss by reducing air resistance and lubricating oil agitation resistance within the housing. Therefore, the gear train lubricating device according to the present invention is not limited to the above-described embodiments but may be widely used in gear systems including a gear train to suppress its power loss.

REFERENCE SIGNS LIST 1 gear system
5 gear train
7 shroud
9 housing
11 input shaft
13 output shaft
21 meshing position
25 oil supply nozzle
41 oil-drain port
43 draw-out port
51 guide member
G1 to G5 gear
OL oil

The invention claimed is:
1. A gear train lubricating device comprising:
a shroud covering a gear train including a plurality of gears meshing with each other, the shroud including an outer peripheral wall covering the gear train from radially outward, side walls covering both respective side faces of the gear train, and an oil supply nozzle configured to supply oil to a meshing position of the gear train and including oil-drain ports through which the oil is discharged from the shroud;
a housing configured to cover the shroud, the housing including at its lower part in a gravitational direction, a draw-out port through which the oil discharged from the oil-drain ports is drawn to outside of the housing; and
guide members provided between the shroud and the housing and configured to guide the oil discharged from the respective oil-drain ports of the shroud such that the oil flows downward in the gravitational direction through space between the shroud and the housing, wherein each of the guide members has at least one end of an axial direction which contact with or adjacent to an inner wall surface of the housing, and at least one portion of a guide face of each of the guide members is opposed to and non-parallel to flow directions of the oil discharged from the oil-drain port to the outside of the shroud to redirect the flow of the oil away from the shroud.

2. The gear train lubricating device according to claim 1, wherein
the oil-drain ports are formed at upper and lower parts of the shroud, the lower parts being below the upper parts in the gravitational direction, and
the draw-out port is disposed below the oil-drain ports formed at the lower part of the shroud.

3. The gear train lubricating device according to claim 2, wherein
the guide members either protrude upward opposite the gravitational direction from an upper wall of the shroud or protrude downward towards the gravitational direction from a lower wall of the shroud.

4. The gear train lubricating device according to claim 1, wherein
the oil-drain ports are formed only at an upper part in a gravitational direction of the shroud.

5. The gear train lubricating device according to claim 4, wherein
the guide members are disposed along one of the side walls of the shroud, and guide the oil discharged from the respective oil-drain ports such that the oil flows downward towards the gravitational direction while preventing the oil from entering the shroud from around rotational axes of the respective gears.

6. The gear train lubricating device according to claim 5, wherein
each of the guide members has its lower edge positioned below a corresponding one of through-holes of the shroud in the gravitational direction, through which the rotational axes penetrate the shroud.

7. The gear train lubricating device according to claim 4, wherein
each of the guide members extends from near one of the oil-drain ports, passes through above one of rotational axes of the gears, and reaches a lower end portion in the gravitational direction of respective the side walls.

8. The gear train lubricating device according to claim 7, wherein
a pair of the guide members are adjacent and have at least a pair of substantially parallel portions, and an auxiliary guide plate is provided between the pair of substantially parallel portions.

9. The gear train lubricating device according to claim 1, wherein
the guide members are fixed to the shroud.

10. The gear train lubricating device according to claim 1, wherein
each of the oil-drain ports is provided such that a position of each of the oil-drain ports is away from the meshing position of the gear train by angles of $90°\pm45°$ in a rotation direction and/or a direction opposite the rotation direction, and each of the oil-drain ports has an angular width of $45°\pm10°$.

* * * * *